United States Patent
Trivelpiece

(10) Patent No.: US 10,878,323 B2
(45) Date of Patent: Dec. 29, 2020

(54) RULES ENGINE COMBINED WITH MESSAGE ROUTING

(71) Applicant: TYCO FIRE & SECURITY GMBH, Neuhausen am Rheinfall (CH)

(72) Inventor: Craig Trivelpiece, Mission Viejo, CA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 197 days.

(21) Appl. No.: 14/463,830

(22) Filed: Aug. 20, 2014

(65) Prior Publication Data

US 2015/0286933 A1    Oct. 8, 2015

Related U.S. Application Data

(60) Provisional application No. 61/973,962, filed on Apr. 2, 2014, provisional application No. 61/946,054, filed on Feb. 28, 2014.

(51) Int. Cl.
*G06N 5/02* (2006.01)
*H04L 29/08* (2006.01)
*H04L 12/717* (2013.01)

(52) U.S. Cl.
CPC ............ *G06N 5/027* (2013.01); *H04L 67/12* (2013.01); *H04L 45/42* (2013.01)

(58) Field of Classification Search
None
See application file for complete search history.

(56) References Cited

U.S. PATENT DOCUMENTS

| | | | |
|---|---|---|---|
| 5,414,812 | A | 5/1995 | Filip et al. |
| 5,727,055 | A | 3/1998 | Ivie et al. |
| 6,012,150 | A | 1/2000 | Bartfai et al. |
| 6,208,247 | B1 | 3/2001 | Agre et al. |
| 6,272,621 | B1 | 8/2001 | Key et al. |
| 6,313,549 | B1 | 11/2001 | Moisan et al. |
| 6,531,963 | B1 | 3/2003 | Nyfelt |

(Continued)

FOREIGN PATENT DOCUMENTS

| | | |
|---|---|---|
| CN | 1217078 A | 5/1999 |
| CN | 1672060 A | 9/2005 |

(Continued)

OTHER PUBLICATIONS

Zoumboulakis, Michael, George Roussos, and Alexandra Poulovassilis. "Active rules for sensor databases." Proceeedings of the 1st international workshop on Data management for sensor networks: in conjunction with VLDB 2004. ACM, 2004. (Year: 2004).*

(Continued)

*Primary Examiner* — Daniel T Pellett
(74) *Attorney, Agent, or Firm* — Foley & Lardner LLP

(57) ABSTRACT

A networked system for managing a physical intrusion detection/alarm includes tiers devices and a rules engine and router to interact with the rules engine and rule engine results, where the router is configured to feed inputs to and receive outputs from the rules engine, and the router further configured to programmatically route results of rule execution by the rules engine to a hierarchical structure stored in computer storage for access by subscriber devices.

19 Claims, 5 Drawing Sheets

(56) References Cited

U.S. PATENT DOCUMENTS

| | | | |
|---|---|---|---|
| 6,636,900 B2 | 10/2003 | Abdelnur |
| 6,873,260 B2 | 3/2005 | Lancos et al. |
| 6,888,459 B2 | 5/2005 | Stilp |
| 6,952,574 B2 | 10/2005 | Tealdi et al. |
| 6,970,183 B1 | 11/2005 | Monroe |
| 7,005,971 B2 | 2/2006 | Stewart et al. |
| 7,295,106 B1 | 11/2007 | Jackson et al. |
| 7,327,251 B2 | 2/2008 | Corbett, Jr. |
| 7,474,330 B2 | 1/2009 | Wren et al. |
| 7,535,687 B2 | 5/2009 | Costa |
| 7,688,808 B2 | 3/2010 | Ren et al. |
| 7,756,828 B2 | 7/2010 | Baron et al. |
| 7,855,635 B2 | 12/2010 | Cohn et al. |
| 7,907,753 B2 | 3/2011 | Wilson et al. |
| 7,920,843 B2 | 4/2011 | Martin et al. |
| 7,966,660 B2 | 6/2011 | Yermal et al. |
| 8,089,910 B2 | 1/2012 | Doh et al. |
| 8,164,443 B2 | 4/2012 | Alston et al. |
| 8,260,893 B1 | 9/2012 | Bandhole et al. |
| 8,305,196 B2 | 11/2012 | Kennedy et al. |
| 8,331,544 B2 | 12/2012 | Kraus et al. |
| 8,350,700 B2 | 1/2013 | Fast et al. |
| 8,395,494 B2 | 3/2013 | Trundle et al. |
| 8,400,268 B1 | 3/2013 | Malik et al. |
| 8,467,763 B2 | 6/2013 | Martin et al. |
| 8,477,687 B2 | 7/2013 | Iwasa |
| 8,487,762 B1 | 7/2013 | McMullen et al. |
| 8,525,665 B1 | 9/2013 | Trundle et al. |
| 8,572,290 B1 | 10/2013 | Mukhopadhyay et al. |
| 8,572,600 B2 | 10/2013 | Chung et al. |
| 8,572,677 B2 | 10/2013 | Bartholomay et al. |
| 8,582,431 B2 | 11/2013 | Johansen |
| 8,587,670 B2 | 11/2013 | Wood et al. |
| 8,611,323 B2 | 12/2013 | Berger et al. |
| 8,630,820 B2 | 1/2014 | Amis |
| 8,634,788 B2 | 1/2014 | Wright et al. |
| 8,643,719 B2 | 2/2014 | Vian et al. |
| 8,644,165 B2 | 2/2014 | Saarimaki et al. |
| 8,659,417 B1 | 2/2014 | Trundle et al. |
| 8,667,571 B2 | 3/2014 | Raleigh |
| 8,675,920 B2 | 3/2014 | Hanson et al. |
| 8,676,930 B2 | 3/2014 | Foisy |
| 8,696,430 B2 | 4/2014 | Wells |
| 8,700,747 B2 | 4/2014 | Spitaels et al. |
| 8,700,749 B2 | 4/2014 | Elliott et al. |
| 8,707,431 B2 | 4/2014 | Stephens et al. |
| 8,731,689 B2 | 5/2014 | Platner et al. |
| 8,732,255 B2 | 5/2014 | Odio et al. |
| 8,732,292 B2 | 5/2014 | Tokunaga et al. |
| 8,737,957 B2 | 5/2014 | Raleigh |
| 8,848,721 B2 | 9/2014 | Turunen et al. |
| 8,989,053 B1 | 3/2015 | Skaaksrud et al. |
| 9,277,352 B1 | 3/2016 | Ward |
| 10,282,852 B1 | 5/2019 | Buibas et al. |
| 2002/0067259 A1 | 6/2002 | Fufidio et al. |
| 2002/0121979 A1 | 9/2002 | Smith |
| 2003/0097464 A1 | 5/2003 | Martinez et al. |
| 2003/0097586 A1 | 5/2003 | Mok |
| 2003/0216144 A1 | 11/2003 | Roese et al. |
| 2004/0017929 A1 | 1/2004 | Bramblet et al. |
| 2004/0027243 A1 | 2/2004 | Carrender |
| 2004/0090329 A1 | 5/2004 | Hitt |
| 2004/0103165 A1* | 5/2004 | Nixon .................. H04W 72/02 709/217 |
| 2004/0109059 A1 | 6/2004 | Kawakita |
| 2004/0135694 A1 | 7/2004 | Nyfelt |
| 2004/0153671 A1 | 8/2004 | Schuyler et al. |
| 2005/0052281 A1 | 3/2005 | Bann |
| 2005/0143133 A1 | 6/2005 | Bridgelall |
| 2006/0022816 A1 | 2/2006 | Yukawa |
| 2006/0035205 A1 | 2/2006 | Dobson et al. |
| 2006/0039356 A1 | 2/2006 | Rao et al. |
| 2006/0047666 A1* | 3/2006 | Bedi .................. G06F 17/3089 |
| 2006/0059557 A1 | 3/2006 | Markham et al. |
| 2006/0143439 A1 | 6/2006 | Arumugam et al. |
| 2006/0240818 A1 | 10/2006 | McCoy et al. |
| 2006/0282886 A1* | 12/2006 | Gaug .................. H04L 63/1408 726/5 |
| 2007/0028119 A1 | 2/2007 | Mirho |
| 2007/0073861 A1 | 3/2007 | Amanuddin et al. |
| 2007/0093975 A1 | 4/2007 | Hoogenboom |
| 2007/0106775 A1 | 5/2007 | Wong |
| 2007/0112574 A1 | 5/2007 | Greene |
| 2007/0185788 A1 | 8/2007 | Dillon |
| 2007/0186106 A1 | 8/2007 | Ting et al. |
| 2007/0223451 A1 | 9/2007 | Ren et al. |
| 2007/0239350 A1 | 10/2007 | Zumsteg et al. |
| 2007/0248065 A1 | 10/2007 | Banerjea et al. |
| 2007/0260470 A1* | 11/2007 | Bornhoevd ............. G06Q 10/08 709/203 |
| 2008/0002599 A1 | 1/2008 | Yau et al. |
| 2008/0010631 A1 | 1/2008 | Harvey et al. |
| 2008/0056261 A1 | 3/2008 | Osborn et al. |
| 2008/0068150 A1 | 3/2008 | Nguyen et al. |
| 2008/0068267 A1 | 3/2008 | Huseth et al. |
| 2008/0130949 A1 | 6/2008 | Ivanov et al. |
| 2008/0136620 A1 | 6/2008 | Lee et al. |
| 2008/0144587 A1 | 6/2008 | Gupta et al. |
| 2008/0259919 A1 | 10/2008 | Monga |
| 2008/0291017 A1 | 11/2008 | Yermal et al. |
| 2009/0021634 A1 | 1/2009 | Chang |
| 2009/0135007 A1 | 5/2009 | Donovan et al. |
| 2009/0222921 A1 | 9/2009 | Mukhopadhyay et al. |
| 2009/0243844 A1 | 10/2009 | Ishidera |
| 2009/0322510 A1 | 12/2009 | Berger et al. |
| 2010/0090829 A1 | 4/2010 | Pujol |
| 2010/0124209 A1 | 5/2010 | In et al. |
| 2010/0217651 A1 | 8/2010 | Crabtree et al. |
| 2010/0226342 A1 | 9/2010 | Colling et al. |
| 2011/0051656 A1 | 3/2011 | Hethuin et al. |
| 2011/0069687 A1 | 3/2011 | Rezvani et al. |
| 2011/0102171 A1 | 5/2011 | Raji et al. |
| 2011/0109434 A1 | 5/2011 | Hadsall, Sr. |
| 2011/0137614 A1 | 6/2011 | Wheeler et al. |
| 2011/0310779 A1 | 12/2011 | De Poorter et al. |
| 2011/0310791 A1 | 12/2011 | Prakash et al. |
| 2012/0014567 A1 | 1/2012 | Allegra et al. |
| 2012/0039235 A1 | 2/2012 | Chen et al. |
| 2012/0131115 A1* | 5/2012 | Levell .................. G06F 9/466 709/206 |
| 2012/0158161 A1 | 6/2012 | Cohn et al. |
| 2012/0159579 A1 | 6/2012 | Pineau et al. |
| 2012/0197986 A1 | 8/2012 | Chen et al. |
| 2012/0266168 A1 | 10/2012 | Spivak et al. |
| 2012/0310423 A1 | 12/2012 | Taft |
| 2012/0311614 A1 | 12/2012 | Deanna et al. |
| 2013/0003645 A1 | 1/2013 | Shapira et al. |
| 2013/0064233 A1 | 3/2013 | Hethuin et al. |
| 2013/0070745 A1 | 3/2013 | Nixon et al. |
| 2013/0239192 A1 | 9/2013 | Linga et al. |
| 2013/0241744 A1 | 9/2013 | Erdos et al. |
| 2013/0317659 A1 | 11/2013 | Thomas et al. |
| 2013/0318529 A1 | 11/2013 | Bishop et al. |
| 2013/0336230 A1 | 12/2013 | Zou et al. |
| 2013/0346229 A1 | 12/2013 | Martin et al. |
| 2014/0035726 A1 | 2/2014 | Schoner et al. |
| 2014/0052832 A1 | 2/2014 | Dina et al. |
| 2014/0129135 A1 | 5/2014 | Holden et al. |
| 2014/0222892 A1 | 8/2014 | Lee et al. |
| 2015/0074178 A1 | 3/2015 | Hong et al. |
| 2015/0248299 A1 | 9/2015 | Rasband et al. |
| 2015/0249588 A1 | 9/2015 | Leon et al. |
| 2015/0257301 A1 | 9/2015 | Morgan et al. |
| 2017/0270722 A1 | 9/2017 | Tse et al. |
| 2018/0107880 A1 | 4/2018 | Danielsson et al. |
| 2018/0181794 A1 | 6/2018 | Benini et al. |
| 2019/0043281 A1 | 2/2019 | Aman |

FOREIGN PATENT DOCUMENTS

| | | |
|---|---|---|
| CN | 1871782 A | 11/2006 |
| CN | 1981313 A | 6/2007 |
| CN | 101199187 A | 6/2008 |
| CN | 101364734 | 9/2009 |

(56) References Cited

FOREIGN PATENT DOCUMENTS

| | | | |
|---|---|---|---|
| CN | 101764759 | A | 6/2010 |
| CN | 101951341 | A | 1/2011 |
| CN | 101976377 | A | 2/2011 |
| CN | 101977124 | A | 2/2011 |
| CN | 102035738 | A | 4/2011 |
| CN | 102316053 | A | 1/2012 |
| CN | 102325075 | A | 1/2012 |
| CN | 202475489 | U | 10/2012 |
| EP | 0 814 393 | B1 | 12/1997 |
| EP | 1 885 039 | B1 | 9/2012 |
| JP | 2005-292942 | A | 10/2005 |
| JP | 2008-090861 | A | 4/2008 |
| WO | WO-01/06401 | A1 | 1/2001 |
| WO | WO-01/26329 | A2 | 4/2001 |
| WO | WO2004/068855 | | 8/2004 |
| WO | WO-2008/139203 | | 11/2008 |
| WO | WO-2009/017687 | A1 | 2/2009 |
| WO | WO2009/079036 | | 6/2009 |
| WO | WO-2013/091678 | A1 | 6/2013 |
| WO | WO-2013/159217 | A1 | 10/2013 |

OTHER PUBLICATIONS

Hunkeler, Urs, Hong Linh Truong, and Andy Stanford-Clark. "MQTT-S—A publish/subscribe protocol for Wireless Sensor Networks. " 2008 3rd International Conference on Communication Systems Software and Middleware and Workshops (COMSWARE'08). IEEE, 2008. (Year: 2008).*
Eugster, Patrick Th, et al. "The many faces of publish/subscribe." ACM computing surveys (CSUR) 35.2 (2003): 114-131. (Year: 2003).*
International Search Report and Written Opinion, PCT/US15/17491.
International Search Report and Written Opinion, PCT/US15/17680.
International Search Report and Written Opinion, PCT/US15/17477.
Supp. EP Search Report, PCT/US2015/017491.
Ying Zhou et al., "*Mobile Agent-based Policy Management for Wireless Sensor Networks*,", Wireless Communications, Networking and Mobile Computing, 2005, Proceedings 2005 Int'l Conference on Wuhan, China, vol. 2, (Sep. 23, 2005), pp. 1207-1210.
European Search Report, PCT/US2015/017212.
Office Action for Chinese Patent Application No. 201580016167 dated May 2, 2018.
Cheng, Research on AODV Routing Protocol of Wireless Network, Chinese Master's Theses Full-Text Database, Information Technology Division, Jul. 15, 2007, 79 pages.
First Office Action for Chinese Application No. 201580015282.5, dated Sep. 4, 2018, 18 pages.
Office Action for U.S. Appl. No. 15/402,423, dated Jul. 26, 2018, 10 pages.
Office Action on U.S. Appl. No. 15/366,036 dated May 31, 2018. 5 pages.
Chinese Office Action dated May 30, 2018 in corresponding application No. 201580016948.9.
Asada et al, Wireless Integrated Network Sensors (WINS) Proceedings of the Spie, Spie, Bellingham, VA, vol. 3673, dated Mar. 1, 1999, pp. 11-18.
Depoorter, Eli, et al., Enabling Direct Connectivity Between Heterogeneous Objections in the Internet of Things Through a Network Service Oriented Architecture, http://jwcn.eurasigjournals.com/content/pdf/1687-1499-2011-61.pdf, dated Aug. 31, 2011, 14 pages.
European Search Report on EP 15755714, dated Oct. 25, 2017, 11 pages.
European Search Report on EP 15756099, dated Oct. 26, 2017, 19 pages.
Hill et al, The Platforms Enabling Wireless Sensor Networks, Communications of the ACM, dated Jun. 2004, vol. 47, No. 6, 6 pages.
International Extended Search Report on Application No. PCT/US00/27515, dated Oct. 18, 2001, 14 pages.
International Search Report and Written Opinion on Application No. PCT/US15/17688, dated Jun. 8, 2015, 10 pages.
International Search Report and Written Opinion on Application No. PCT/US15/17696 dated Jun. 8, 2015, 12 pages.
International Search Report and Written Opinion on Application No. PCT/US15/17702 dated Jun. 17, 2015, 16 pages.
International Search Report and Written Opinion on Application No. PCT/US15/11924, dated Jun. 5, 2015, 7 pages.
International Search Report and Written Opinion on Application No. PCT/US15/17931 dated Jun. 10, 2015, 11 pages.
International Search Report and Written Opinion on Application No. PCT/US2015/017212, dated Jun. 2, 2015, 10 pages.
International Search Report and Written Opinion on Application No. PCT/US2015/017221, dated May 26, 2015, 11 pages.
International Supplementary Search Report on Application No. PCT/US2015/017931, dated Mar. 11, 2017, 11 pages.
Office Action on Chinese Application No. 201580013946.4, dated Jul. 31, 2018, 13 pages with translation.
Office Action on CN Application No. 201580016167.X, dated May 2, 2018, 20 page with translation.
Second Chinese Office Action for Application No. CN 201580015274.0 dated Jul. 3, 2019, 11 pages.
U.S. Appl. No. 61/946,054, filed Feb. 28, 2014, Paul B. Rasband et al.
U.S. Appl. No. 61/973,962, filed Apr. 2, 2014, Stewart E. Hall et al.
Chen et al., Enix: a lightweight dynamic operating system for tightly constrained wireless sensor platforms, Proceedings of the 8th ACM Conference on Embedded Networked Sensor Systems, dated Nov. 3, 2010, 14 pages. http://sensys.acm.org/2010/Papers/p183-Chen.pdf.
International Search Report and Written Opinion on PCT/US15/017450, dated Jun. 10, 2015, 6 pages.
International Search Report and Written Opinion on PCT/US15/017477, dated Jun. 10, 2015, 7 pages.
International Search Report and Written Opinion on PCT/US15/017481, dated Jun. 10, 2015, 6 pages.
International Search Report and Written Opinion on PCT/US15/017491, dated Jun. 10, 2015, 6 pages.
International Search Report and Written Opinion on PCT/US15/024050, dated Jul. 20, 2015, 8 pages.
International Search Report and Written Opinion on PCT/US2015/017212, dated Jun. 2, 2015, 10 pages.
International Search Report and Written Opinion on PCT/US2015/017221, dated May 26, 2015, 11 pages.
International Search Report and Written Opinion on PCT/US2015/017491, dated Jun. 10, 2015, 15 pages.
International Search Report and Written Opinion on PCT/US2015/017924, dated Jun. 5, 2015, 12 pages.
International Search Report and Written Opinion on PCT/US2015/017931, dated Jun. 10, 2015, 11 pages.
Office Action on CN 201580013943.0, dated Mar. 21, 2019, 20 pages with translation.
Office Action on CN 2201580019382.5, dated Jul. 31, 2U19, 17 pages with translation.
Office Action on CN 201580019386.3, dated Jun. 4, 2019, 34 pages with translation.
Office Action on CN 201580019691.2, dated Apr. 29, 2019, 15 pages with translation.
Office Action on CN 201580019697.X, dated Feb. 26, 2019, 20 pages with translation.
Office Action on CN 201580020164.3 dated Mar. 27, 2019, 24 pages with translation.
Office Action on CN 201580021841.3, dated Jun. 26, 2019, 16 pages with translation.
Office Action on CN 201580026024.7, dated Jun. 4, 2019, 12 pages with translation.
Office Action on EP 15754691.2, dated May 10, 2019, 5 pages.
Office Action on EP 15755018.7, dated Jul. 9, 2019, 6 pages.
Office Action on EP 15755018.7, dated Sep. 11, 2018, 5 pages.
Office Action on EP 15755117.7, dated Aug. 9, 2019, 6 pages.
Office Action on EP 15755330.6, dated Jun. 19, 2019, 6 pages.

(56) References Cited

OTHER PUBLICATIONS

Office Action on EP 15755456.9, dated Mar. 7, 2019, 5 pages.
Office Action on EP 15755880.0, dated Jan. 30, 2019, 5 pages.
Office Action on JP 2016-560736, dated Feb. 5, 2019, 5 pages with translation.
Supplementary European Search Report on 15754909.8, dated Nov. 7, 2017, 10 pages.
Supplementary European Search Report on EP 15754818.1, dated Dec. 14, 2017, 8 pages.
Supplementary European Search Report on 15755417.1 dated Oct. 23, 2017, 14 pages.
Supplementary European Search Report on EP 15756099.6, dated Oct. 26, 2017, 18 pages.
Supplementary European Search Report on EP 15774423, dated Nov. 17, 2017, 1 page.
CP for European Patent Application No. 15754818.1 DTD Dec. 19, 2019, 6 pages.
Search Report on EP 15774423.6 dated Jan. 7, 2020, 6 pages.
EPO Extended Search Report dated Jul. 13, 2020—App No. 20168200.2-1213.
Liang, "Social Network Service," Mar. 31, 2013, pp. 137-138. English language translation unavailable. English portions only.
Office Action on CN 201580013946.4, dated Sep. 25, 2020, 13 pages with English translation. English portions only.
Office Action on CN 201580022068.2, dated Aug. 26, 2020, 13 pages with English translation. English portions only.

\* cited by examiner

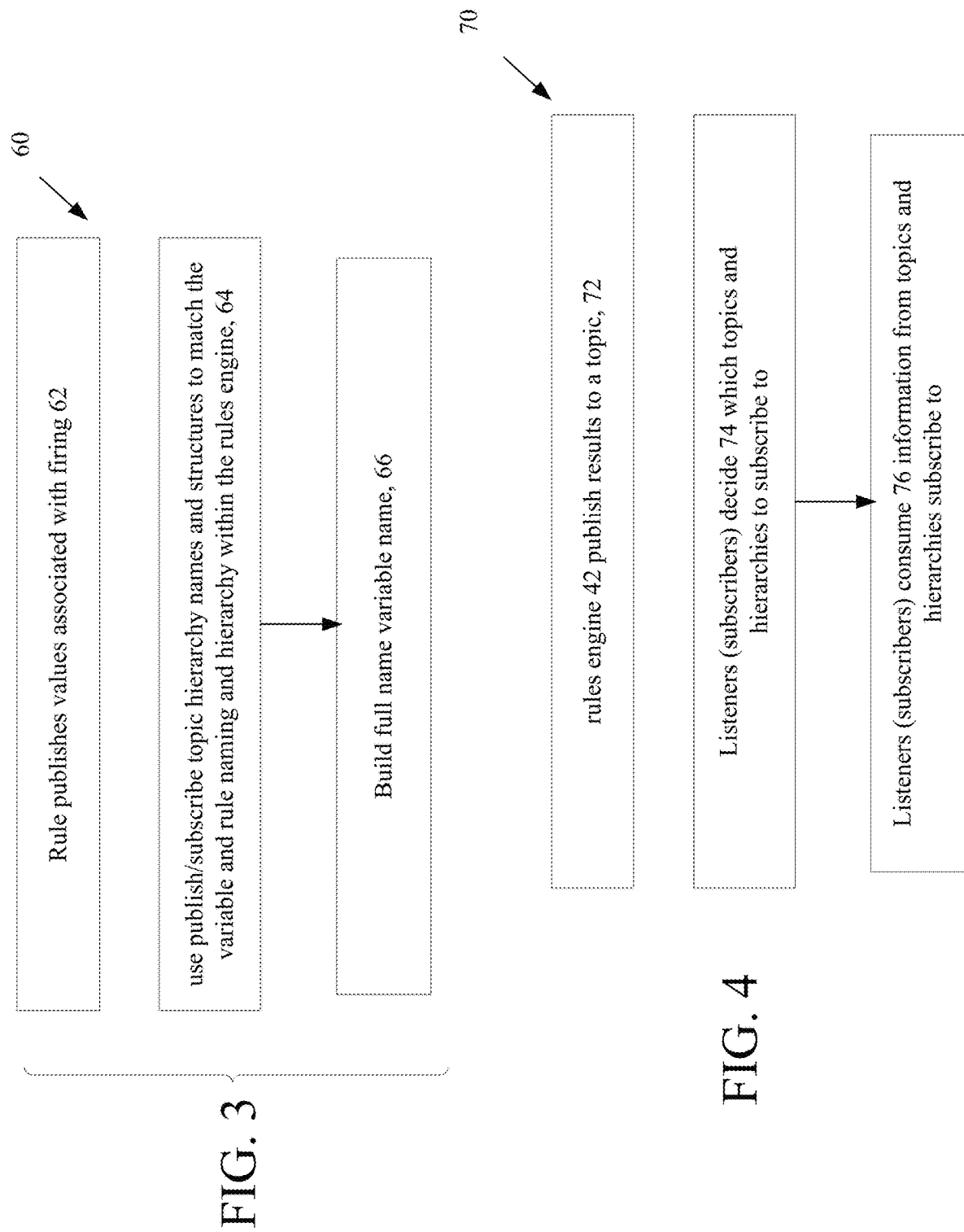

RULES ENGINE COMBINED WITH MESSAGE ROUTING

CLAIM OF PRIORITY

This application claims priority under 35 U.S.C. § 119(e) to provisional U.S. Patent Application 61/973,962, filed on Apr. 2, 2014, entitled: "Wireless Sensor Network", and provisional U.S. Patent Application 61/946,054, filed on Feb. 28, 2014, entitled: "Wireless Sensor Network", the entire contents of which are hereby incorporated by reference.

BACKGROUND

This description relates to operation of data collection systems in particular security systems.

Wireless sensor device data collection systems with remote server-based monitoring and report generation are becoming more common in applications such as home safety monitoring, electrical and water utility meter monitoring and human and asset tracking. For example, it is common for businesses and homeowners to have a security system for detecting alarm conditions at their premises and signaling the conditions to a monitoring station or to authorized users of the security system.

Many devices such as those involved in sensor networks use a rules engine as a subcomponent for processing rules that control and monitor processes executing on devices. The execution of rules may produce no output as when monitoring devices update internal values and processes or execution of rules may be an indication that a rule has fired (executed). As a subcomponent, rules and data updates are sent to the rules engine and rules either fire or do not fire. In a typical system, another component evaluates the output of the rules engine and determines an action to take such as where results should be sent or if additional processes are needed or if the rule is chained to other rules or in a general sense how to route the outputs from firing of the rules. In complex control systems, muting decisions and actions to and from a rules engine can be a major portion of the effort involved in writing code to accomplish transfers of the results.

SUMMARY

Data inputs and rules updates to a rules engine typically come from a single source that controls the rules engine and interfaces with the rest of the system. These typical implementations require significant additional software and configuration to properly perform and to route rules, data and actions. Depending upon the complexity of the system, it can be very difficult to manage and maintain the proper configurations for such a system.

Enhancing complex rules with additional functions is problematic due to execution time and stability of the additional functions interfering with the timely execution of the rules engine. In complex control systems, routing decisions and actions from execution of rules by a rules engine can be a major portion of the effort.

According to an aspect, a system for managing of a rules engine is disclosed. The system includes a computing device implementing a rules engine and a router to interact with the rules engine and rule engine results, the router configured to feed inputs to and receive outputs from the rules engine and the router further configured to programmatically route results of rule execution by the rules engine to a hierarchical structure stored in computer storage for access by subscriber devices.

The following are some embodiments within this aspect.

The rules engine operates with a defined rules format that supports routing information within the rule itself. The rules engine operates with a defined rules format that supports routing information that is associated with the rule. The router supports a publish/subscribe connectivity protocol. The router supports a MQTT connectivity protocol. When a rule executes the rules engine automatically publishes the output of the rule to a specific publish topic in the hierarchical structure. Other processes subscribe to access the hierarchical structure to receive and process outputs of rules that fired. The hierarchical structure is arranged as sets of topics with a superset of topics being topics that are higher in the hierarchy than the topic subscribed to. The processes/devices are sensor processes and sensor devices.

Other aspects include methods for managing a network of sensor devices and computer program products for managing a network of sensor devices.

Aspects may include one or more of the following advantages.

Implementations may eliminate the need for an external interface to the rules engine to determine and perform routing functions. When a rule fires, if the rule includes a publish topic, the output of the rule is automatically published to a specific publish topic (routing destination) contained in the rule. All other processes that require results of the output of that rule, e.g., "interested processes" subscribe to the topic or supersets of that topic and receive and process the output of the rule. This allows publisher devices/processes to directly send variable updates without needing to separately specify a path to the data location within the rules engine. No synchronization of configuration data is needed to maintain the routing. Thus, multiple processes can perform completely different functions on the same rule result by all just subscribing to the same topic. Rule outputs can be automatically rerouted to the rules engine to perform chaining of results. Complex additional functional routines can assist rules without slowing down the rules engine and without risking stopping rules engine execution. This is done through loosely connect/coupled publish/subscribe connections.

The details of one or more embodiments of the invention are set forth in the accompanying drawings and the description below. Other features, objects, and advantages of the invention is apparent from the description and drawings, and from the claims.

DESCRIPTION OF DRAWINGS

FIGS. 3-5 are flow charts.

DETAILED DESCRIPTION

Described are examples of network features that may be used in various contexts including, but not limited to, security/intrusion and alarm systems. Example security systems may include an intrusion detection panel that is electrically or wirelessly connected to a variety of sensors.

Those sensor types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
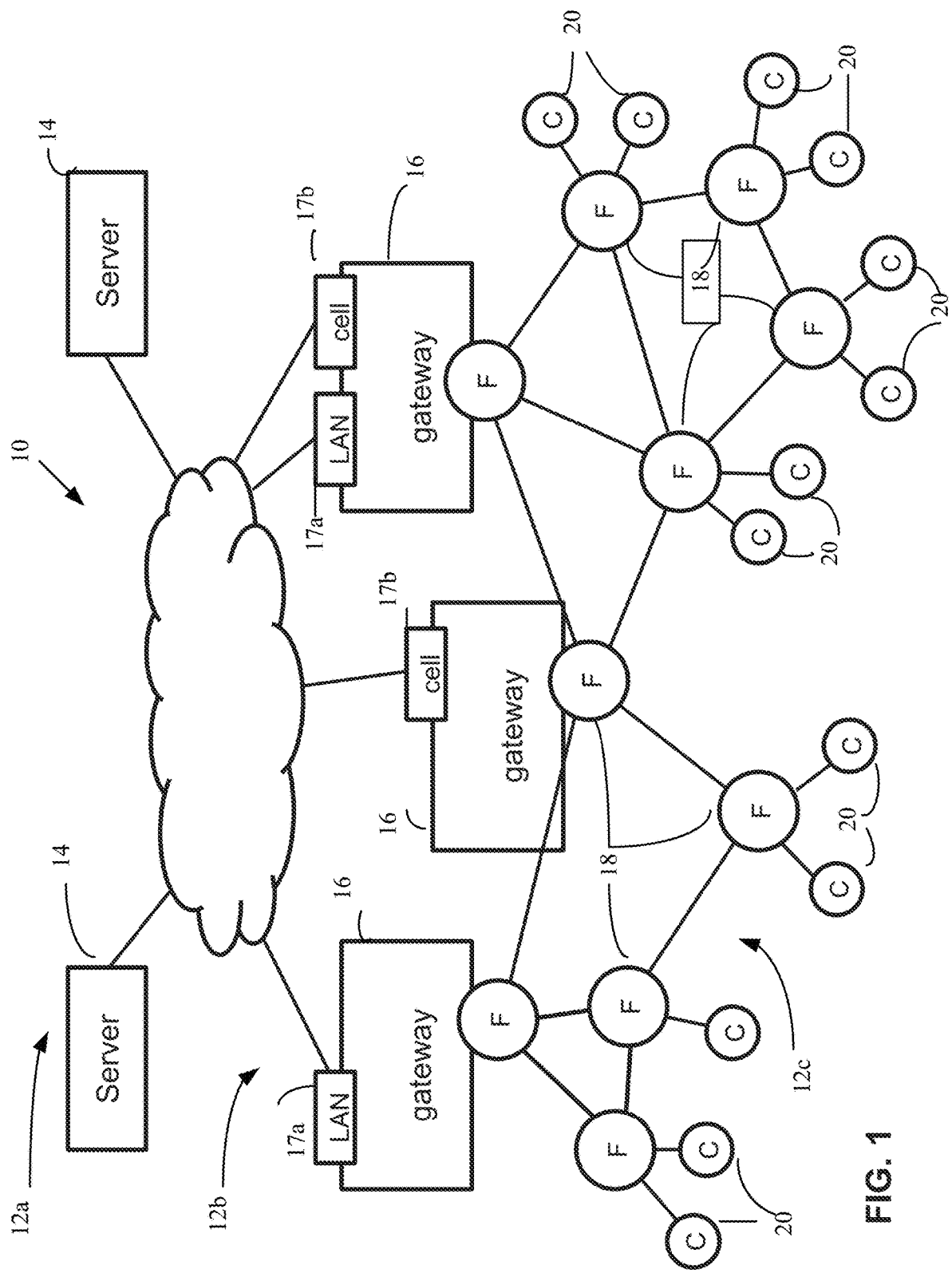
FIG. 1 is a block diagram of an exemplary networked security system.

Referring now to FIG. 1, an exemplary (global) distributed network topology for a Wireless Sensor Network (WSN) is shown. In FIG. 1 the distributed network 10 is logically divided into a set of tiers or hierarchical levels 12a-12c. The global distributed network topology for the sensor network includes distributed rule engines denoted by the circle element "R" at individual nodes or collections of nodes. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Figure 2:
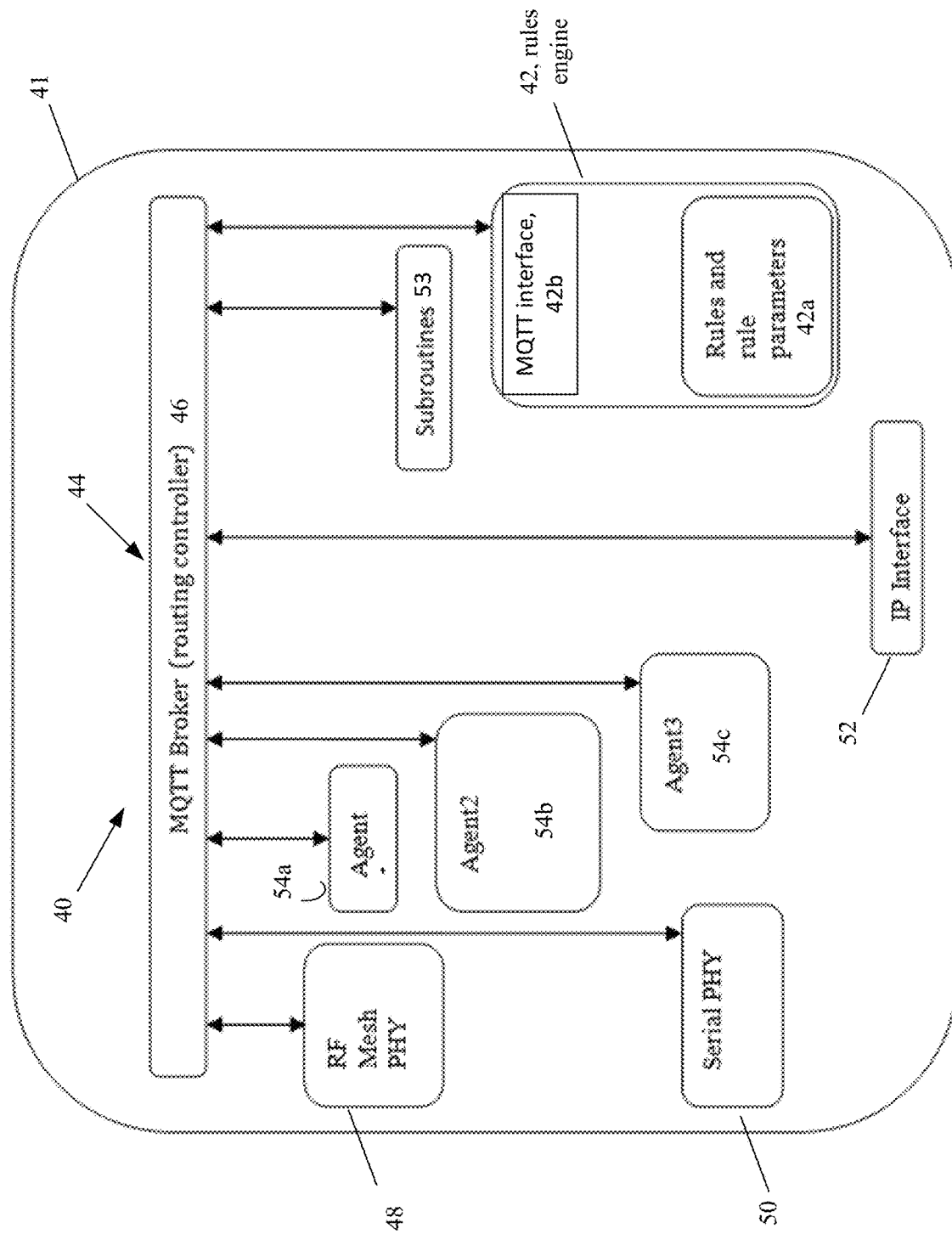
FIG. 2 is block diagram of a messaging/rules engine system.

Referring now to FIG. 2, an arrangement 40 is provided on a device 41 that includes a rules engine 42 that is integrated with message routing 44. The arrangement 40 functionally and/or physically combines the rules engine 42 with a publish/subscribe (or other) type of message routing system. Rules for the rules engine 42 are written that in addition to including rule details, optionally include a publish topic (routing destination) and payload of variables. When a rule fires, if the rule includes a publish topic, the output of the rule is automatically published to a specific publish topic (routing destination) contained in the rule. All other processes that require results of the output of that rule, e.g., "interested processes" subscribe to the topic or supersets of that topic and receive and process the output of the rule. In other implementations of the rule, the rule instead of having the optional publish topic, has a destination that is either another rule or device, which is not a specific publish topic. Subroutines 53 may be executed by the routing controller 46 as part of routing of messages.

The device 41 includes in addition to the rules engine 42 and message routing various subsystems such as a routing controller 46 that operates using a suitable machine-to-machine connectivity protocol such as the "MQTT" (MQ Telemetry Transport) where MQTT is a machine-to-machine (M2M)/"Internet of Things" connectivity protocol. (See mqtt) also referred to as Message Query Telemetry Transport. The device 41 also includes interfaces 48, 50, 52 here an RF (radio frequency) mesh physical layer interface 48, a serial physical layer interface 50, and an IP (Internet Protocol interface) 52. Agents 54a-54c are able to interact with the rules engine 42 and results provided by the rules engine 42. The agents 54a-54c are instances of independent software agents or rule implementation modules (independently running functions that check input conditions and react accordingly) that run on devices, such as gateways. In device 41, the rules engine 42 and the various subsystems such as the interfaces 48, 50, 52 and agents 54a-54c interface with the routing system through the routing controller 46, as shown.

The arrangement 40 provides on device 41 a routing system 44 that interfaces with the input and output of rules engine 42. The arrangement 40 defines a rules format that supports routing information within the rule itself or in association with the rule. When a rule fires, the arrangement 40 knows programmatically where to automatically route the results.

The device 41 has the MQTT broker serving as the routing controller, and the RF mesh physical layer interface 48 and a serial physical layer interface 50 and IP interface 52 are used to send and receive messages, rules, data, etc. to/from other components in the arrangement 40. The rules engine 42 also includes storage 42a for rules and rule parameters, etc. and a rules engine MQTT interface 42b. The rules engine 42 thus includes the various rules and rule parameters needed for the engine 42, which are stored on a computer readable hardware storage device.

Referring now to FIG. 3, the arrangement 40 executes a process 60 that provides for the rule to publish 62 values of the variables associated with the rule at the time of firing and any additional variables needed. This is useful for later analysis later by a system in order to understand why a rule fired and to develop refinements to the rule and to model processes in understanding the rule situation, A further enhancement uses the publish/subscribe topic hierarchy names and structures to match 64 the variable and rule naming and hierarchy within the rules engine. This method allows publisher devices/processes to directly send variable updates without needing to separately specify a path to the data location within the rules engine. In systems such as MQTT-SN where the routing definitions are converted to routing IDs for compression, this can greatly reduce transmission size over wireless networks.

The routing system in front of the rules engine programmatically builds 66 the full variable name from the routing path so this is not needed in the payload portion of the routed message. An example of this routing method automatically producing a complex variable name is set out below:

Sent from a device:

---
/DeviceID/SensorOut/Temperature - routing and identification portion
Key=5              - payload with a Key/Value pair
---

Converted to rules variable format that includes the hierarchical structure and sent to the rules engine:

DeviceID.SensorOut.Temperature.Key=5

Referring now to FIG. 4, the complexities of routing rule engines inputs and outputs among many devices and processes is obviated by the rules engine 42 including an integrated method of automatically assigning routing by routing arrangement 44 and an optional payload. Routing of messages uses the "publish/subscribe" technique and the particular version used is the MQTT protocol, as discussed above. The MQTT routing protocol supports publisher devices/processes that produce and announce data to particular names known as topics. In the context of FIG. 1, topics can be "/sensors" that correspond to various sensors in the network of FIG. 1. The structure of "topics" supports multiple levels of hierarchy and wild card selections of all or portions of the hierarchy.

Publisher devices/processes do not know or need to know of any listeners (actual destinations that will consume results of rule execution). Publisher devices, such as the rules engine 42 need only publish results 72 to a topic. Other devices, referred to as listeners, i.e., subscribers, decide 74 which topics and hierarchies to subscribe to. None or one or more subscriber devices/processes choose to listen to a particular published topic and retrieve associated data that is published to that topic. Listeners (subscribers) receive, that is consume 76 information from the topics and hierarchies that the listeners had subscribe to.

None or one or more subscriber devices/processes choose to listen to a particular published topic and receive associated data. Thus, multiple subscriber devices/processes do not interfere with each other and rather consume subscribed to information at different rates. The arrangement 40 combines a rules engine, e.g., rules engine 42, with a publish/subscribe (or other) type of message routing system controller 46. Rules are written including, the rule executable, necessary parameters, a publish topic, and payload of variables.

Figure 5:
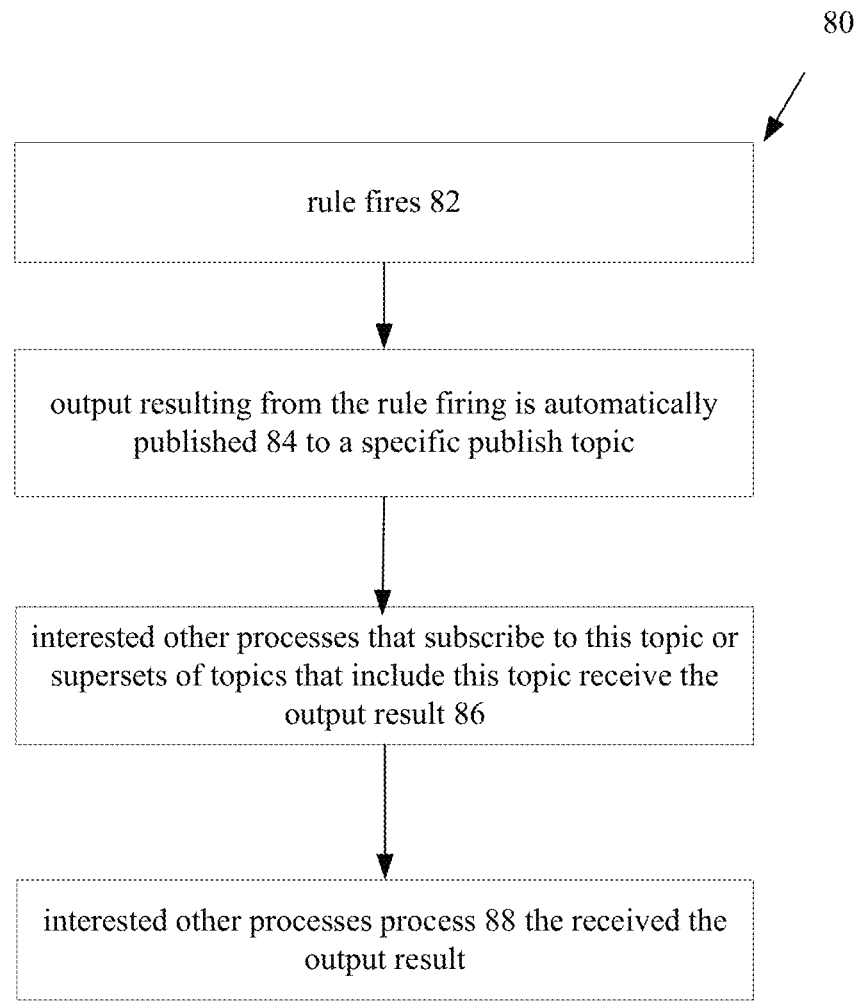

Referring now to FIG. 5, a rule fires 82, and an output resulting from the rule firing is automatically published 84 to a specific publish topic. All processes interested in the rule results, which subscribe to this topic or supersets of topics that include this topic, receive the output result 86. The interested other processes that received the output results, process 88 the received output result of the rule that fired according to the particular receiving process.

This arrangement eliminates the need for an external interface to the rules engine to determine and perform routing functions. No synchronization of configuration data is needed to maintain the routing. Thus, multiple processes can perform completely different functions on the same rule result by all just subscribing to the same topic. Rule outputs can be automatically rerouted to the rules engine to perform chaining of results. Complex additional functional routines can assist rules without slowing down the rules engine and without risking stopping rules engine execution. This is done through loosely connect/coupled publish/subscribe connections.

Receivers of the rules output can obtain an atomic message that includes all of the variable settings involved in the rule. This allows receivers to know the exact state of all parameters at the moment that rule "fired." This state can be analyzed to determine why the rule fired and for optimization of subsequent firing/use of the rule. In general, inputs to rules engines are data sent from a single interface routine that manages the flow of data and the responses. Any device or process that wants to send data to the rules engine publishes results to defined topics and the rules engine will receive and process them.

The rules engine may be implemented using any appropriate type of computing device, such as a mainframe work station, a personal computer, a server, a portable computing device, or any other type of intelligent device capable of executing instructions, connecting to a network, and forwarding data packets through the network. The engines can execute any appropriate computer programs to generate, receive, and transmit data packets for use on the network.

Each of processes discussed above may be stored on one or more non-transitory machine-readable media, such as computer memory persistent or non-persistent to store executable instructions. Each of these devices may also include one or more processing devices (e.g., microprocessors, programmable logic, application-specific integrated circuits, and so forth) for executing the instructions to perform all or part of the functions described herein.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Figure 6:
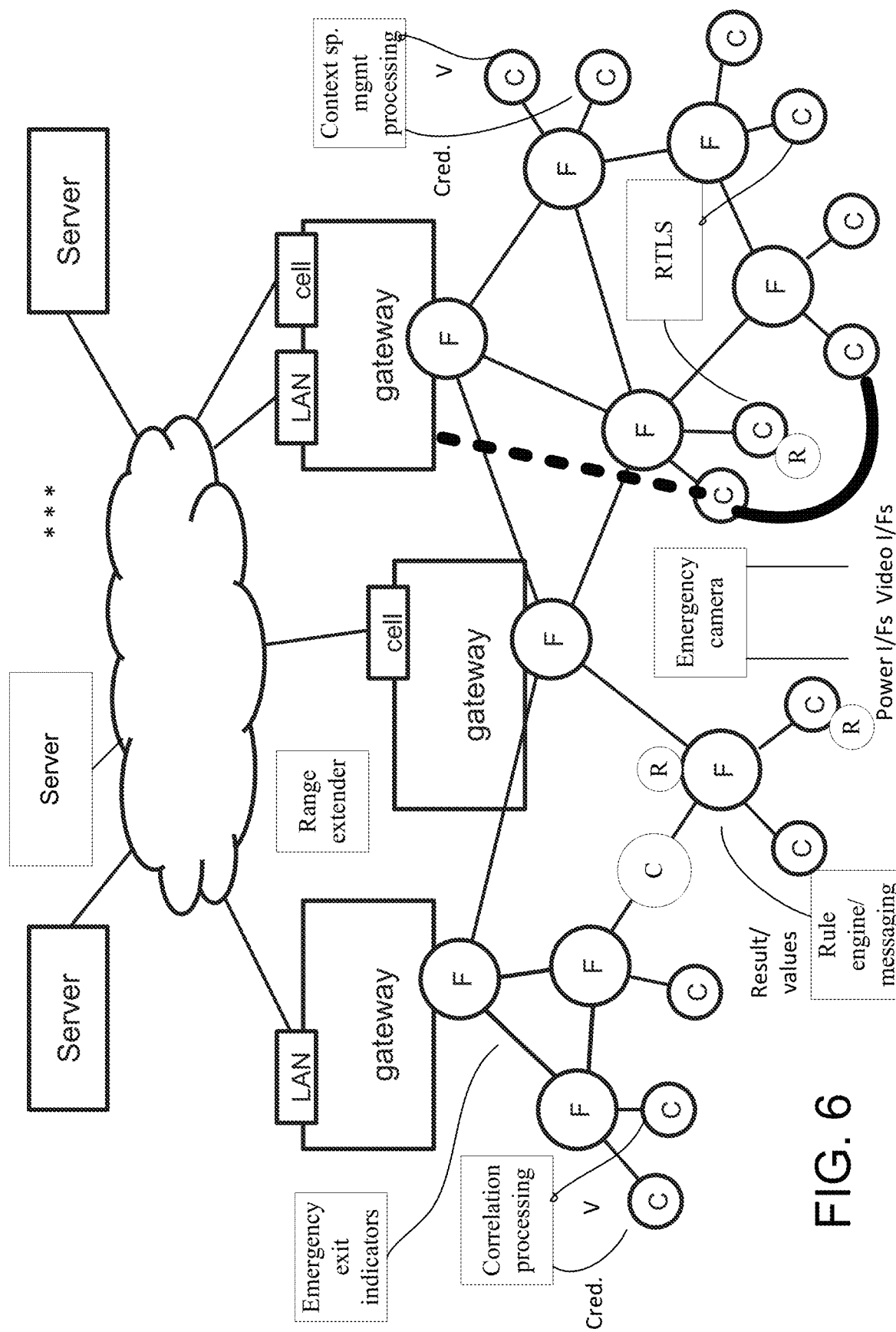
FIG. 6 is a block diagram with components of an exemplary networked security system.

FIG. 6 shows an example of a security system having features of the WSN described with respect to FIG. 1 and having the various functionalities described herein. As shown in FIG. 6, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A system to manage processing and routing of information, the system comprising:
   a single computing device comprising a processing circuit including a processor and memory having instructions stored thereon, the processor configured to execute the instructions to implement a routing controller and a rules engine, the single computing device configured to:
      receive a single message including a rule, the rule including a subscription topic, a rule procedure associated with the subscription topic, and a payload, wherein the rule procedure describes one or more actions, and the payload includes a publishing topic;
      subscribe to the subscription topic to receive data;
      in response to the single computing device receiving the data, execute the rule procedure associated with the subscription topic to perform the one or more actions on the data to produce a processing result;
      determine a destination based on the publishing topic of the payload, wherein the destination is a gateway device, and wherein devices subscribe to the gateway device to receive messages; and
      publish the processing result to the destination determined based on the publishing topic; and
   wherein the single computing device is configured to facilitate routing the processing result without separately specifying a path to a data location.

2. The system of claim 1, wherein the publishing topic is a hierarchical topic.

3. The system of claim 1, wherein the single computing device is further configured to:
   route the processing result to a second computing device based on the publishing topic; and
   route the processing result to storage for access by subscriber devices based on the publishing topic.

4. The system of claim 1, wherein the single computing device supports a Message Query Telemetry Transport (MQTT) connectivity protocol.

5. The system of claim 1, wherein the single computing device is a sensor device.

6. The system of claim 5, wherein the sensor device connects to a wireless sensor network and the wireless sensor network connects to an external network.

7. The system of claim 1, wherein the subscription topic is a hierarchical topic.

8. The system of claim 1, wherein the payload includes one or more variables.

9. A method for managing a network of sensor devices, the method comprising:
   receiving, by a first device, a single message including a rule, wherein the rule includes a subscription topic, a rule procedure associated with the subscription topic, and a payload, wherein the rule procedure describes one or more actions, and the payload includes a publishing topic;
   subscribing, by the first device, to the subscription topic to receive data;
   in response to the first device receiving data, performing, by the first device, the one or more actions of the rule procedure on the data to produce a processing result;
   determining, by the first device, a destination based on the publishing topic of the payload, wherein the destination is a gateway device, and wherein devices subscribe to the gateway device to receive messages; and
   publishing, by the first device, the processing result to the destination determined based on the publishing topic; and
   wherein the first device is configured to facilitate routing the processing result without separately specifying a path to a data location.

10. The method of claim 9, publishing further comprising:
    sending the processing result to a computing device; and
    sending the processing result to a hierarchical structure in computer storage according to the publishing topic for access by subscriber devices.

11. The method of claim 10, wherein the subscriber devices are sensor devices.

12. The method of claim 9, wherein the payload includes one or more variables.

13. A system for managing a network of sensor devices, the system comprising:
    a plurality of sensor devices, at least one of the plurality of sensor devices comprising a processing circuit including a processor and memory having instructions stored thereon, the processor configured to execute the instructions to implement a routing controller and a rules engine, the at least one sensor device configured to:
       receive a single message including a rule, the rule including a subscription topic, a rule procedure associated with the subscription topic, and a payload, wherein the rule procedure describes one or more actions, and the payload includes a publishing topic;
       subscribe to the subscription topic to receive data;
       in response to receiving the data, execute the rule to perform the one or more actions of the rule procedure associated with the subscription topic on the data to produce a processing result;
       determine a destination based on the publishing topic of the payload; and publish the processing result to the destination determined based on the publishing topic;

one or more gateway devices configured to receive the processing result published by the at least one sensor device and provide the processing result to subscriber devices; and wherein the at least one sensor device is configured to facilitate routing the processing result without separately specifying a path to a data location.

14. The system of claim 13, wherein the at least one sensor device supports a Message Query Telemetry Transport (MQTT) connectivity protocol.

15. The system of claim 13, wherein the subscriber devices are one or more of the plurality of sensor devices.

16. The system of claim 13, wherein the publishing topic specifies a specific gateway device of the one or more gateway devices as the destination.

17. The system of claim 13, wherein the subscriber devices subscribe to a specific topic on a specific gateway device of the one or more gateway devices to receive the processing result.

18. The system of claim 13, wherein publishing topic specifies a specific topic in a hierarchical structure to send the processing result.

19. The system of claim 13, wherein the payload includes one or more variables.

* * * * *